United States Patent [19]

Newell

[11] Patent Number: 5,201,870
[45] Date of Patent: Apr. 13, 1993

[54] REVERSE STOP RACHET AND PAWL FOR A FISHING REEL

[76] Inventor: Carl W. Newell, 955 Avonoak, Glendale, Calif. 91206

[21] Appl. No.: 627,247

[22] Filed: Dec. 14, 1990

[51] Int. Cl.⁵ .......................................... A01K 89/02
[52] U.S. Cl. .................................................. 242/298
[58] Field of Search ............... 242/298, 299, 300, 247; 74/577 S, 577 R

[56] References Cited

U.S. PATENT DOCUMENTS

| | | | |
|---|---|---|---|
| 1,173,325 | 2/1916 | Sylvester | 74/577 S |
| 2,417,732 | 3/1947 | Bland et al. | 242/308 X |
| 2,974,895 | 3/1961 | Wood | 242/299 X |
| 3,027,114 | 3/1962 | Grieten | 242/298 X |
| 3,478,979 | 11/1969 | Henze | 242/298 X |
| 4,422,600 | 12/1983 | Preston | 242/298 X |
| 4,516,741 | 5/1985 | Hashimoto | 242/298 X |
| 4,673,143 | 6/1987 | Intengan | 242/299 X |

Primary Examiner—Daniel P. Stodola
Attorney, Agent, or Firm—Harlan P. Huebner

[57] ABSTRACT

A reverse stop ratchet and pawl for a fishing reel including a ratchet wheel mounted on a bridge sleeve to which a crank handle is secured for clockwise rotation, and at least one pawl of a specific new configuration to engage specifically complementary contoured rachet teeth on said wheel to prevent reverse or counter clockwise rotation of said rachet wheel and said bridge sleeve.

2 Claims, 1 Drawing Sheet

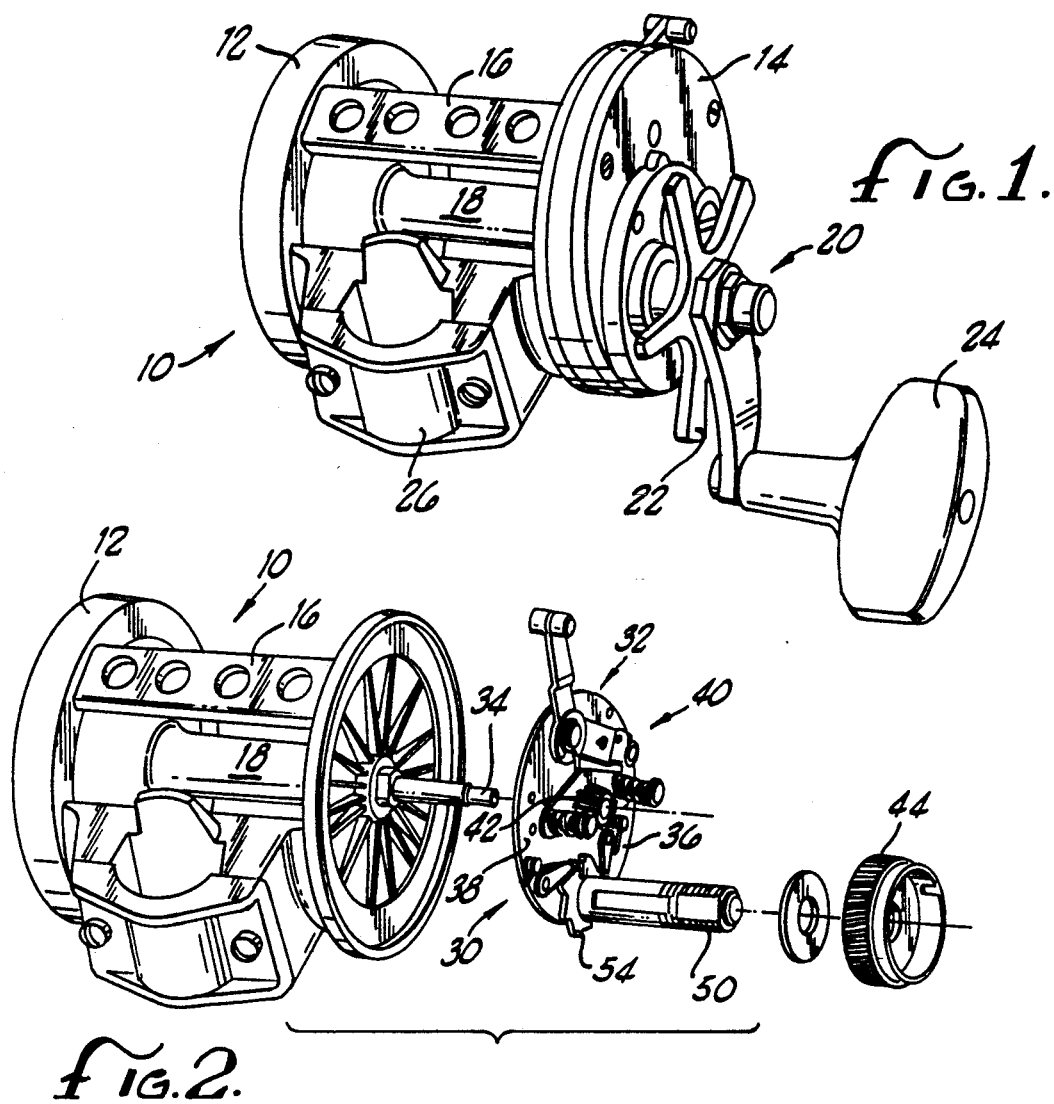
fig.1.
fig.2.
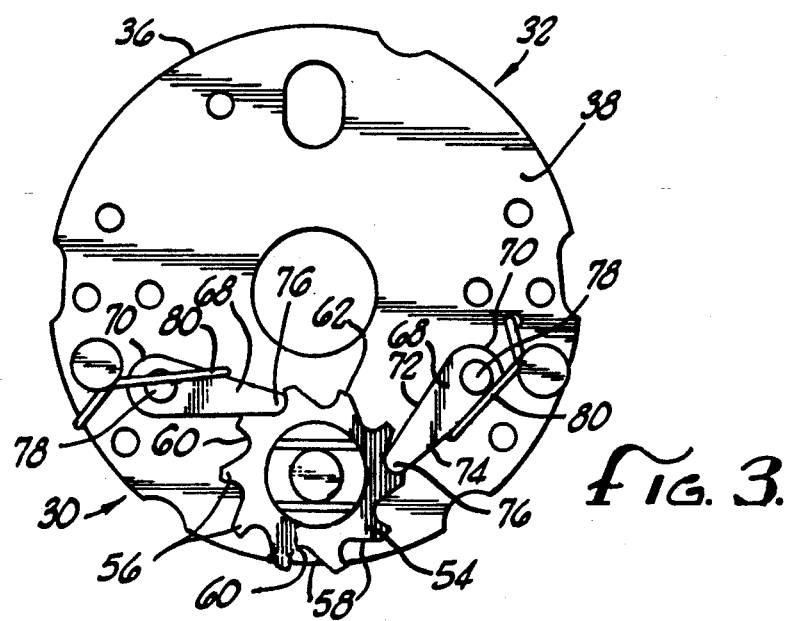
fig.3.

REVERSE STOP RACHET AND PAWL FOR A FISHING REEL

BACKGROUND OF THE INVENTION

1. Field of the Invention

This invention relates to a reverse stop means in the form of a ratchet and pawl to prevent back spin of a spool of a fishing reel.

2. Description of the Prior Art

Previously, fishing reels have been equipped with reverse stop means associated with a bridge sleeve that in turn is connected to a crank handle. The reverse stop means have been a single pawl or dog and ratchet wheel on the end of the bridge sleeve remote from the handle. The purpose of the reverse stop means is to prevent the bridge sleeve and in turn the crank handle from rotating in the reverse direction so as to unwind the spool and line thereon.

However, the construction of the prior art ratchet teeth of the ratchet wheel as well as the mating end of the pawl has resulted in a breaking off of the end of the pawl or dog as well as a sheering of the tooth. This breakage will usually occur when the drag portion of the reel is engaged and there is a sudden reverse on the spool by a fish running with the line on the spool. In normal reels the crank handle is to reel in the line and the reverse stop on the bridge sleeve will prevent reversal. However, the construction of prior art dogs or pawls include a straight forward edge that intersect at each side and the side walls form sharp corners. The ratchet teeth are complementary with the forward shape of the pawl and include outer edges of the ratchet wheel and pawl engaging portions of the teeth that are straight sided. Such structure presents a sharp corner so that with a great pull on the drag by a large fish the pawl tips may shear off the tip portions thereby allowing free reverse movement of the bridge sleeve and crank handle. Such movement can both injure the hand of the fisherman holding the reel and also can foul the line on the spool.

SUMMARY OF THE INVENTION

It is a purpose of the present invention to provide a new and improved reverse stop means for a fishing reel that employs a ratchet wheel on a bridge sleeve and at least two pawls or dogs to engage the ratchet wheel to prevent reverse rotation of the bridge sleeve and crank handle.

Another object of the present invention is to provide a construction of the ratchet teeth and engagement area thereof that is new and different and includes a larger area of engagement to prevent shearing off of the teeth.

A yet further object of the present invention is to provide a pawl or dog that includes an engagement area complementary with the ratchet teeth area to aid in the prevention of sheering off the ratchet teeth and allowing unwanted reverse rotation of the bridge sleeve and crank handle.

Another object of the present invention is to provide a new pawl or dog of such a construction as to be reversible so that either side may be mounted on the bride plate to engage the ratchet wheel. Such a pawl construction because of its reversibility will save time in assembly.

A further object of the present invention is to provide a ratchet wheel and pawl for a fishing reel that may be made of heat treated or non-heat treated metal.

These and other objects and advantages will become apparent from the following part of the specification wherein details have been described for the competence of disclosure without intending to limit the scope of the invention which is set forth in the appended claims.

BRIEF DESCRIPTION OF THE DRAWINGS

These advantages may be clearly understood from the following detailed description and by reference to the drawings in which:

FIG. 1 is a perspective view of a fishing reel which includes the present invention;

FIG. 2 is a perspective exploded view of a fishing reel including the present invention, and FIG. 3 is a side elevational view of the reverse stop means of the present invention.

DETAILED DESCRIPTION OF THE PREFERRED EMBODIMENT

Referring to FIG. 1 there is illustrated a conventional fishing reel generally designed 10. It includes side plate structures 12 and 14, a frame post 16 therebetween, plus another not illustrated and a spool 18 for receiving fishing line (not shown). Secured to plate 14 is a drag and free spooling means designated 20, a star drag assembly 22 and a crank handle 24. Also a clamp 26 is formed to mount the reel 10 on a fishing rod.

The present invention lines tn the reverse stop means designed 30 which is mounted on a bridge plate 32. The plate 32 is mounted to side plate 14 and slides over a spindle 34 of the spool 18 and within the side plate structure 14.

The plate 32 is preferably made of relatively hard metal and has an annular edge 36 of a diameter to fit within the side plate structure 14. The plate 32 also has an outer surface 38.

Mounted on the plate 32 is a pinion gear assembly 40, not forming a part of the present invention. However, the pinion gear 42 and a main gear 44 are matable for purposes to be described. The spool shaft 34 slides into a hole (not shown) bored through pinion gear 42 and engages the same.

When the gears 42 and 44 are in a position where they mate or engage each other the turning of the handle 24 will in turn rotate an elongated bridge sleeve 50 to which it is attached. The bridge sleeve 50 is rotatably mounted on the bridge plate 32. The main gear 44 is mounted on the sleeve 50 and as it rotates so does the pinion gear 42 which in turn will rotate the spool 18 to wind in fishing line onto the spool 18.

In order to prevent a reverse rotation of the bridge sleeve 50 and in turn the crank handle 24 during the cranking operation or to prevent reverse rotation of the sleeve and attached crank handle the stop means 30 is provided.

The means 30 includes a ratchet wheel 54 mounted on the bridge plate 32 and abutting the outer surface 38 of the plate 32. Circumferentially spaced around the wheel 54 are ratchet teeth 56. The teeth 56 are each formed by an inwardly projecting generally flat pawl engaging surface 58 and an arcuate end pawl engaging surface 60 merging with said surface 58 and extending outwardly back to the outer edge 62 of the wheel 54. This construction will ensure a deep tooth for contact.

The stop means 30 also includes at least one pawl 68. In the preferred embodiment there are two pawls 68. The pawls 68 are elongated with an outer or back end 70 that may be curved of any given diameter, a pair of flat opposed tapered side walls 72 and 74 and a tooth engaging inner end 76 that may also be curved of a lesser diameter than end 70.

The pawls 68 are pivotally mounted on surface 38 by pivot pins 78 adjacent ends 70.

In order to constantly urge the pawls 68 into contact with teeth, spring pressure is applied by springs 80.

As can be seen in FIG. 3 the curved surface 60 of the rachet tooth 56 is complementary with the curved tooth engaging end 76 of the pawl and the flat surface 58 of the tooth 56 is engaged by the flat portion of the side wall 72 or 74.

The construction of each tooth 56 is such that the flat tapered side walls 72 and 74 are both the same so that when a pawl is installed it may be placed on the pivot pin 78 with either side facing the annular edge 36 of plate 32. This saves considerable time in assembly as well as the intellect necessary to assemble the stop means. The prior art pawls were of such a construction that they could only be installed in one way to operate properly.

With the present construction it can be seen that with the clockwise rotation of the bridge sleeve 50 and rachet wheel 54 the pawls 68 will slip freely over the teeth 56. However, when the sleeve 50 is attempted to be reversed in a counter-clockwise direction the pawls 68 will engage the teeth 56 and prevent rotation of the bridge sleeve 50 and crank handle 24.

With the new construction for the teeth 56 there is a greater seating area for the pawls 68 along surface 60 and 58. Such a construction will accomplish two major objectives, 1. It will act as a positive stop with no slippage and 2. It will reduce the chances of the pawls breaking a tooth 56 with an accelerated impact. In the previous pawls that included sharp ends there was a tendency to sheer off the teeth and thus require frequent repair and replacements.

In addition, where two pawls 68 are used the positive reversal stoppage is further increased.

It should also be recognized that while two pawls 68 are illustrated, with a large sea water reel and increased size of the parts a third pawl could be utilized for increased reverse stoppage.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A reverse stop assembly for a fishing reel wherein said reel includes a bridge plate associated with one of two side plate structures of said reel having a spool rotatably mounted between said plate structures, a bridge sleeve rotatably mounted on said bridge plate and projecting therefrom, and a crank handle mounted on said bridge sleeve for clockwise rotation and linked to said spool by gears, said stop assembly including:

a rachet wheel mounted on said bridge sleeve, said wheel including an annular edge and a plurality of ratchet teeth circumferentially spaced around said wheel and each tooth including an elongated straight pawl engagable edge projecting from said annular edge into said wheel and an arcuate pawl engaging end surface extending from said straight edge back to said annular edge; and a spring biased pawl pivotally mounted on said bridge plate exteriorly of said ratchet wheel and adapted to be biased against and slip freely over said ratchet teeth and said annular edge of said ratchet when said wheel is rotated in a clockwise direction, but engagable with one of said teeth without damaging said teeth upon reversal of said ratchet wheel to prevent counter clockwise rotation of said ratchet wheel, said pawl including an outer end and a smaller arcuate ratchet tooth engaging inner end with a pair of tapered elongated flat side walls each of equal length and taper extending between said two ends, either of said elongated sides and said smaller end of said pawl are complementary with said elongated straight pawl engagable edge and said arcuate pawl engaging end surface respectively of said ratchet teeth and said rachet and pawl are each assured of surface locking contact wherein said ratchet teeth are prevented from breakage upon engagement with said tooth engaging inner end due to the arcuate shape of said arcuate pawl engaging end surface and said arcuate pawl engaging surface no matter which of said elongated flat side walls of said pawl is in contact with said ratchet.

2. A reverse stop means as denied in claim 1 wherein there are:

a pair of spring biased pawls mounted on said bridge plate each simultaneously engagable with a separate ratchet tooth when said ratchet wheel is moved counter clockwise.

* * * * *